United States Patent [19]

Riley

[11] Patent Number: 4,808,994
[45] Date of Patent: Feb. 28, 1989

[54] LOGIC INTERCHANGE SYSTEM

[76] Inventor: Robert E. Riley, P.O. Box 1024, Ridgeland, Miss. 39157

[21] Appl. No.: 89,838

[22] Filed: Aug. 27, 1987

[51] Int. Cl.⁴ .............................................. H04Q 1/00
[52] U.S. Cl. ......................... 340/825.57; 340/825.06; 340/825.65; 340/825.67
[58] Field of Search ............ 340/52 F, 825.57, 825.06, 340/825.1, 825.17, 825.65, 825.67; 318/DIG. 2; 307/10 R

[56] References Cited

U.S. PATENT DOCUMENTS

| | | | |
|---|---|---|---|
| 3,651,454 | 7/1972 | Venema et al. | 340/52 |
| 4,173,754 | 11/1979 | Feiker | 340/825.52 X |
| 4,298,860 | 12/1981 | Norberg et al. | 340/825.04 |
| 4,374,348 | 2/1983 | Shimura et al. | 318/DIG. 2 |
| 4,463,341 | 1/1984 | Iwasaki | 340/310 A |
| 4,484,190 | 9/1984 | Bedard | 340/825.57 |
| 4,499,463 | 5/1985 | Jacquel | 340/825.52 |
| 4,516,121 | 7/1985 | Moriyama et al. | 340/825.05 |
| 4,524,288 | 6/1985 | Schimmelpennink et al. | 307/40 |
| 4,578,591 | 4/1986 | Floyd et al. | 307/10 R |
| 4,594,571 | 1/1986 | Neuhaus et al. | 307/10 R |
| 4,630,043 | 11/1986 | Haubner et al. | 340/825.57 |
| 4,652,853 | 6/1987 | Tagami et al. | 340/825.06 |

Primary Examiner—Ulysses Weldon
Attorney, Agent, or Firm—Walter C. Farley

[57] ABSTRACT

A system for remotely controlling electrical devices includes a plurality of identical modules which can be made as multiple copies of an integrated circuit chip. Each chip includes logic for recognizing a code, the logic being programmable by EEPROMs so that each chip can be set to recognize a unique address code. The modules can be connected to input or output devices, or both. All modules are interconnected by no more than four wires. A clock pulse source is connected to the system, the source being periodically interrupted to synchronize the system when the clock pulses restart.

9 Claims, 6 Drawing Sheets

LOGIC INTERCHANGE SYSTEM

This invention relates to a control system of the type usable to remotely control a variety of devices, particularly those which are capable of being controlled by a two-state signal, with great savings in installation and maintenance costs and improved operational characteristics, particularly as to reliability and noise immunity.

BACKGROUND OF THE INVENTION

Control systems in various contexts have become extremely complex and constitute a major cost item. One example arises in the environment of a factory such as a paper mill in which many devices such as motors, valves, etc., are controlled from a central control room. It has previously been necessary to run a set of wires from each switch, pushbutton or the like in the control room to each device in the field in order to be able to control that device independently of other devices. The result is that the number of wires in a factory of significant size can easily be in the thousands. The cost of the copper or other metal is obviously enormous and the labor to install such a system is even greater. In addition, the conduits to hold the wires can total several square feet in cross section, and if a problem arises in the wiring the task of locating and repairing or replacing the offending wire or wires is extremely difficult.

Another example is found in the modern automobile. Each controllable electrical device in an automobile requires that a wire, or a pair or wires, be run from the location of the device to the dashboard or other control location. The more such devices there are, the more complex the problem, but even on the simplest vehicles produced today, the wiring harnesses which are needed are large, complicated, expensive and heavy, not only adding to the initial cost of the vehicle but also reducing its fuel efficiency.

Recent efforts have been made by various inventors, notably employees of automotive companies, to develop multiplex systems which use a small number of wires, compared with the traditional systems, to accomplish the necessary control. The systems developed thus far, however, appear to have two major disadvantages, cost and complexity. In addition, it does not appear that previously developed systems can operate in a "noisy" environment with the kind of reliability which must be guaranteed in an automotive context as well as in many industrial environments. The noise referred to in this context is, of course, electrical rather than acoustic noise.

SUMMARY OF THE INVENTION

An object of the present invention is to provide a control system in which one cable having only four wires therein can be used to control a large number of independently operable devices at remote locations from the input elements which are used to accomplish the control.

A further object is to provide such a system in which system reliability and noise immunity is improved as compared with conventional control systems.

A still further object is to provide a programmable module which can be produced in large numbers in the form of an integrated circuit at low cost and which can be used in the same configuration at both the input (control) and output (controlled) locations with no structural change except for internal programming.

Briefly described, in one aspect the invention comprises a controller system including a control location having a plurality of programmable control modules, each of the modules having an input device connected thereto for supplying to the module an input signal capable of having two states and a plurality of programmable controlled modules. Each controlled module has an output device connected thereto for performing a specified function. The control modules and the controlled modules are all identical to each other except for programming, the controlled modules being physically located separate from the control location. A four-wire cable interconnects all of the control modules and all of the controlled modules and spans the physical separation between them. A source of clock pulses is connected to one of the wires in the cable. Each of the modules includes encoding/decoding means which is programmed to uniquely operatively associate one of the control modules with a preselected one or more of the controlled modules so that a control module responds to an input signal supplied thereto by its input device and produces and couples to the cable a control digital signal in response to a count unique to the control module. The signal generated by the control device is acted upon by only the selected one or ones of the controlled modules during the count to produce output signals for causing the associated output device or devices to perform their specified functions.

In another aspect, the invention includes a programmable module usable as either a control module or a controlled module in a digital control system including a signal input terminal, a signal output terminal and a data input/output terminal and a source of clock pulses. A counter is connected to receive clock pulses from the source for producing a digital output representative of the pulse count. Programmable logic circuit means is connected to receive the output of the counter and is programmed to produce an output in response to a preselected count. A gate circuit is connected to receive the output of the logic circuit means and the clock pulses and is connected to the input terminal. Bistable circuit means is connected to the output of the gate circuit means and to the data input/output terminal for assuming a sequence of states consistent with the high/low states on the data input/output terminal in response to the output of the gate circuit means. Programmable logic means at the output of the bistable circuit means produces a module output signal only when the sequence of states of the bistable circuit means forms a predetermined digital pattern matching the pattern stored in the programmable logic means.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this specification, and wherein.

DESCRIPTION OF THE PREFERRED EMBODIMENT

Figure 1:
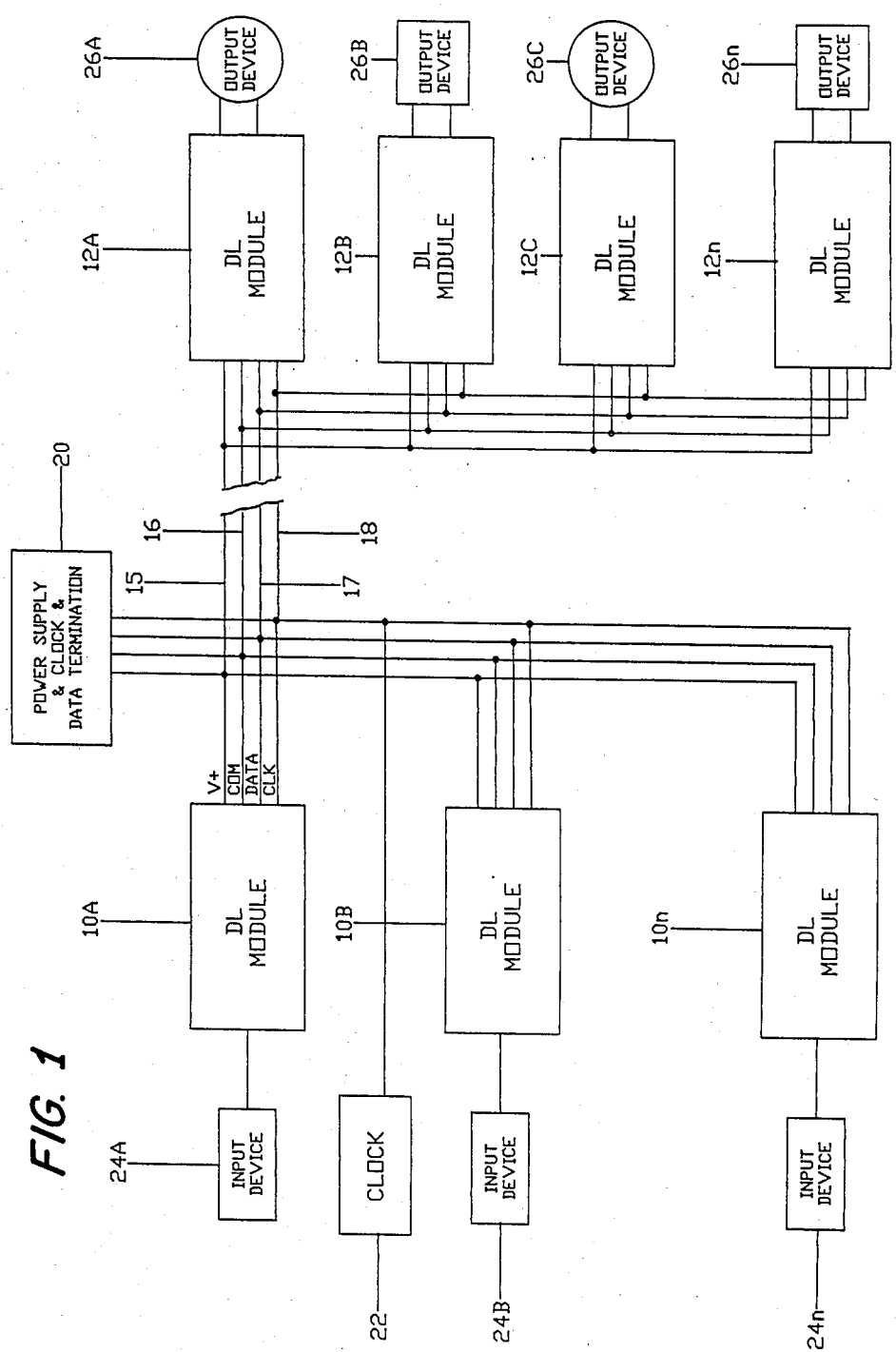
FIG. 1 is a schematic block diagram of an overall system incorporating the present invention.

FIG. 1 illustrates a typical system which can be constructed in accordance with the present invention. The system includes a plurality of control data link (DL) modules 10a, 10b, . . . 10n and a plurality of controlled data link modules 12a, 12b, 12c, . . . 12n. The specific numbers of control and controlled modules are not at all critical, the numbers being chosen on the basis of input and output devices to be serviced. The system also includes an interconnecting cable which, in most cases, would include four wires 15, 16, 17 and 18, wire 15 being provided to supply DC voltage for all of the modules, wire 16 being a common wire for the power supply, wire 17 being a data bus and wire 18 being a clock pulse conductor. In the embodiment of FIG. 1, wires 15 and 16 are connected to a power supply 20 which furnishes power to all of the modules. It will be recognized, however, that in some circumstances, it may be desirable to provide several different power supplies for different groups of modules, depending upon the circumstances involved. It also may be possible to eliminate the common conductor if a common ground is readily available otherwise.

A source of clock pulses 22 is connected to conductor 18.

Wires 15-18 are connected to all of the modules and the order or arrangement of the interconnection is of no importance whatsoever. It is only important that the clock pulse wire 18 be connected to the proper clock pulse input terminal at each module and that the other wires be connected to the proper terminals on the modules. Otherwise, the wiring arrangement can be established in whatever way is convenient under the circumstances of the installation.

The system further includes a plurality of input devices 24a, 24b, . . . 24n, one for each input module; and a plurality of output devices 26a, 26b, 26c . . . 26n, one for each output module. As before, the suffix "n" is intended to indicate any number.

Some general concepts which are important to an understanding of the present invention can be described in connection with this rather broad block diagram. One concept is that the modules 10a, 10b, . . . 10n and 12a, 12b, 12c, . . . 12n are all identical. As will be described in some detail, each module is conveniently made in the form of an integrated circuit "chip" which includes programmable portions in the nature of electrically erasable programmable read only memory devices (EEPROMS). The EEPROMS themselves can be of the type shown and described in U.S. Pat. No. 4,667,312, Doung et al, although various forms thereof are possible. Each module, whether it be a control module or a controlled module, can be structurally and electrically identical to each other module except for the programming which is accomplished in the EEPROM portions thereof. A module is determined to be an input module because, and only because, it is connected to an input device. Otherwise, there is nothing to distinguish an input module from an output module. Similarly, the output module is such because it is connected to an output device.

In the system of FIG. 1, modules 10a-10n are grouped to the left of the drawing and are connected to the output modules 12a-12n by a four-wire cable which is depicted in such a way as to suggest considerable separation between the input and output devices. This separation can be a matter of a few feet or of hundreds of feet. The system operates equally well under either set of circumstances.

A further aspect of the system which should be recognized is that the output modules can concurrently be used as input modules for purposes of feeding back information about the output devices. It is also possible to program and connect the modules 10a-10n in such a way that they provide an indication of the states of the output devices which they are controlling. Generally speaking, each input device must be of a type which produces a two-state output, i.e., the input must be in the nature of a switch which is either open or closed. Obviously, this need not be a mechanical switch but, rather, can be a switchable electronic device or any other signal source capable of controllably providing an output at either of two electrical levels. It follows from this that a separate microprocessor, separately programmed, can be used with suitable interface devices to act as the input devices for one or all of the control modules. The output device can be a two-state device, such as a relay, or can be a motor or other device which is controllable by a two-state command.

Figure 2:
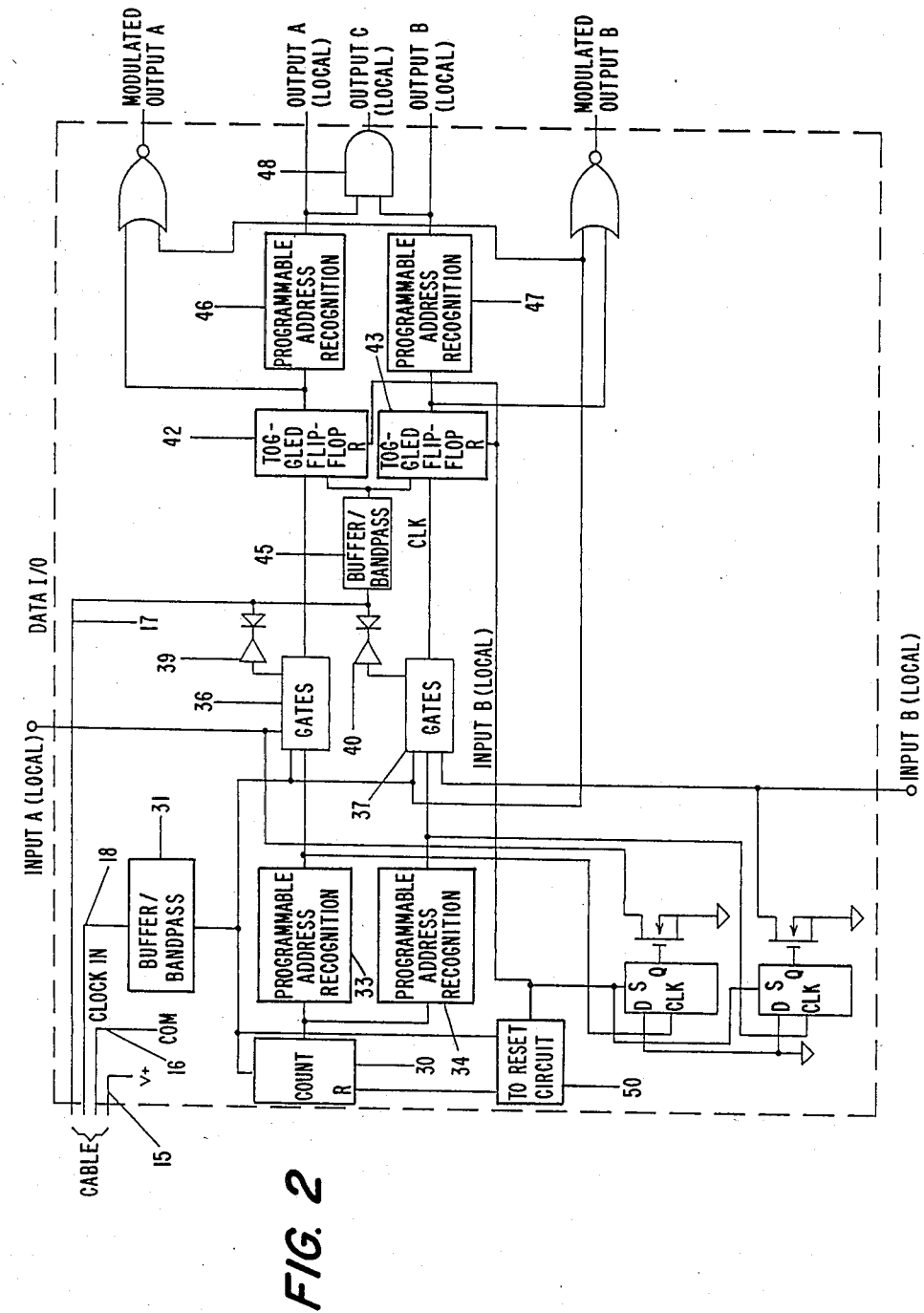
FIG. 2 is a schematic block diagram of an individual module usable in the system of FIG. 1.

One of the data link modules is shown in FIG. 2. As will be recognized, wires 15-18 are connected to the module. In addition, there are various input and output wires identified as input A, input B, output A, output B and output C. However, these are all local signals, which means that they leave the module to be connected to input and output devices in the immediate vicinity and therefore do not require extensive lengths of cable.

Within each module is a counter 30 which receives the clock pulse input on wire 18 through a buffer and bandpass circuit 31 which substantially reduces the noise sensitivity of the system. The counter is a substantially conventional binary counter having eight outputs which are delivered to programmable address recognition logic units 33 and 34. The counter responds to the positive transition of each clock pulse to increment to the next count. As will be described, each programmable address recognition unit includes gates associated with a plurality of EEPROM devices programmed so that recognition unit responds to one and only one specific output of counter 30. In the preferred, current embodiment, counter 30 is designed to count from 0 through 255 which means that each address recognition device can be programmed to respond to any one of 256 possible codes. This also means that there can be as many as 256 uniquely coded control modules and, similarly, 256 uniquely coded output modules. It should be recognized, however, that more than one input module can be associated with an output module and vice versa.

The outputs of recognition logic unit 33 and 34 are applied to the inputs of gate circuits 36 and 37, respectively. Gate circuit 36 also receives an input from local input A and a buffer clock input, and gate circuit 37 receives inputs from the clock and input B. Gate 36 has a data output to the data input-output line 17 which is buffered through an amplifier 39. Gate circuit 37 has a similar output buffered by an amplifier 40. The outputs from gates 36 and 37 are supplied, respectively, to the clock inputs of toggled bistable flip-flop circuits 42 and 43. The data input is supplied through a buffer/bandpass circuit 45 to the data inputs of bistable circuits 42 and 43.

The outputs of the bistable circuits are connected to programmable EEPROM circuits 46 and 47, respectively, the outputs of these recognition circuits being outputs A and B, respectively. An AND gate 48 receives the outputs A and B and provides an output C.

Before proceeding with a discussion of the circuit operation, it will be recognized that the module shown in FIG. 2 has two substantially identical channels beginning with circuits 33 and 34. It is quite possible to build a module which has only one channel and which is programmable and usable in accordance with the invention. However, by providing two channels on a single integrated circuit chip, a relatively simple thing to do, it is possible to include AND circuit 48 which provides output C and it is further possible to perform certain control functions, such as the energization and deenergization of a motor controller, which could not be fully accomplished with one channel only.

Finally, the apparatus of FIG. 2 includes a reset circuit 50 which provides a time-delayed reset signal to counter 30 and flip-flop circuits 42 and 43 in the absence of a selected number of clock pulses from buffer 31. This provides a very simple and highly effective synchronization technique. Clock 22 is designed to produce 256 pulses followed by an interval equal in length to, for example, four or eight clock pulse cycles during which no clock pulses are produced. In the present system, the clock pulses are regarded as being negative pulses which means that, during the "no pulse" interval, the output of the clock circuit is held high. Circuit 50 includes a time constant circuit which times out within an interval equal in length to two or three clock pulse cycles, at the end of which a reset signal is produced which resets the counter. Then, when the clock commences again, all of the portions of the system are started together and are in synchronization. Thus, the system is resynchronized after every 256 pulses.

The operation of the modules will be described briefly with reference to FIG. 2. As the counter counts clock pulses, it reaches a count which is recognized by the programmable address recognition circuits 33 and 34 at the positive clock pulse transition which then produce outputs which are ANDed together, the AND output, in the embodiment shown, being low. If input A is concurrently low, gate circuit 36 produces an output which is buffered through amplifier circuit 39 and coupled as a module output to the data input/output line. During the second half of the clock pulse cycle when the pulse is low, the gate circuits produce outputs which are applied to the CLK inputs of bistable circuits 42 and 43. If there is data supplied on the data line from another module, that signal is applied to the data inputs of bistable circuits 42 and 43, causing the circuits to assume the state indicated by the state of the data line. Depending upon the programming of circuits 46 and 47, the outputs of the bistable circuits appear as one or more of outputs A, B and C.

Figure 3:
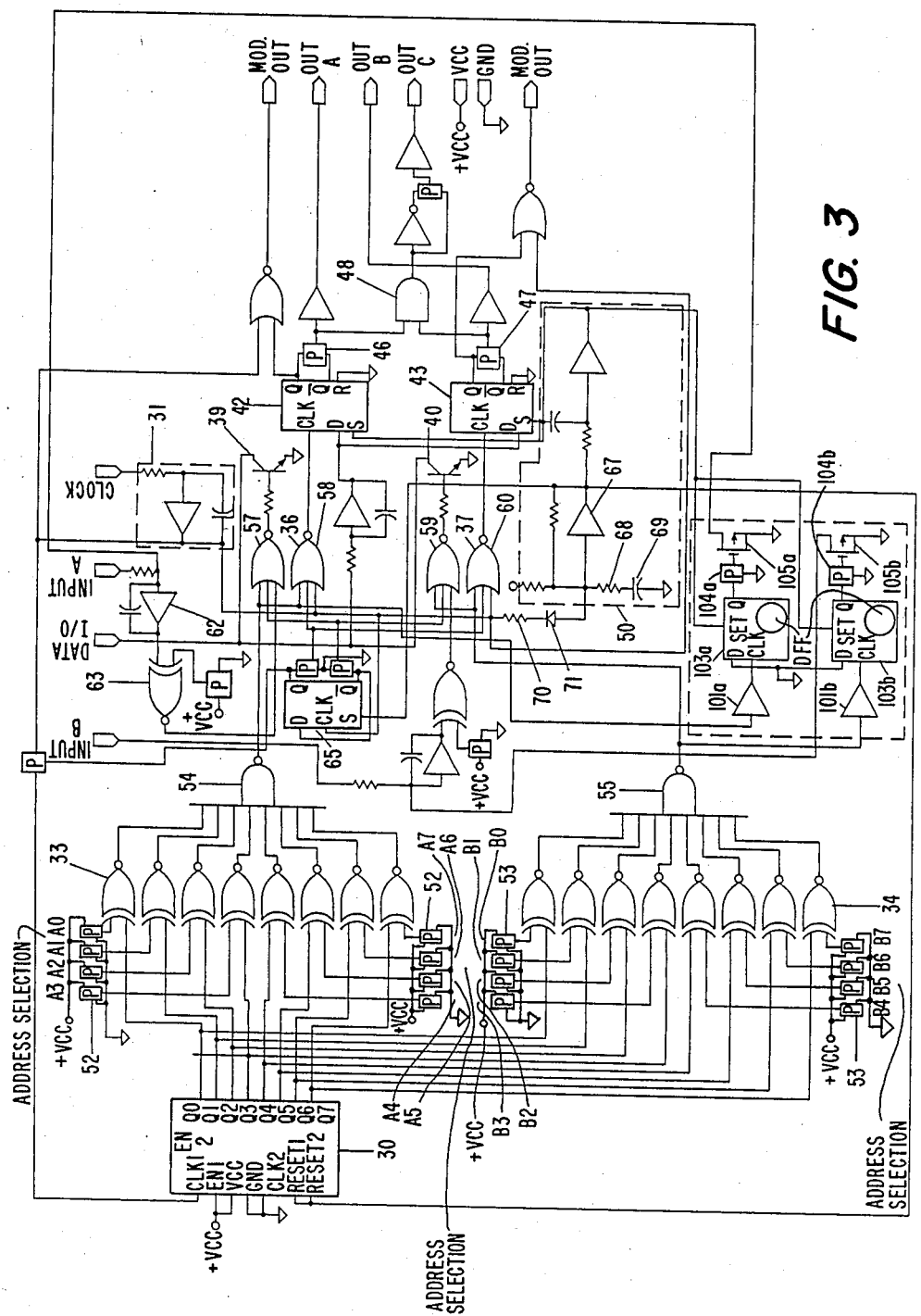
FIG. 3 is a more detailed schematic block diagram of the module of FIG. 2.

The manner in which this is achieved will be more clearly understood by reference to the detailed block diagram of FIG. 3. As seen therein, counter 30 produces a parallel output which is coupled to a plurality of exclusive NOR gates in circuits 33 and 34. Each gate has two inputs, one connected to the counter output and the other connected to one of a plurality of programmable EEPROM devices P indicated generally at 52. Each of these devices can be programmed in advance to connect its associated gate terminal to either the positive source or ground, as desired. Once programmed, in a particular installation, the program would normally be left unchanged for as long as the module is operating in that installation for the intended function. However, the programming can be erased and reestablished, if desired. Programmable devices 52 are thus programmed to establish that the gates in circuit 33 will recognize a specific input combination and produce outputs identical to each other at the groups of exclusive NOR gate outputs which are connected to AND circuits 54 and 55, respectively. This provides enabling inputs to NOR gate circuits 57 and 58 in circuit 36 and gates 59 and 60 in circuit 37.

Clock pulses are supplied through a noise rejecting buffer and bandpass circuit 31 which includes an operational amplifier with capacitive feedback and resistive input, a circuit used in various places in the module to be highly effective for noise rejection purposes. A 220 picofard capacitor and a resistor in the order of 22k or 47k provides a suitable time constant for this purpose.

Input A is coupled through a similar buffer circuit indicated generally at 62 and through a programmable gate 63 to an input of gate 57. Input B is passed through a similar circuit. In the embodiment of FIG. 3, a bistable circuit 65 which is provided with programmable outputs, can be set to provide the third input to each of gates 57, 58, 59 and 60. If input A or input B is present, gate 57 or 59 couples a low output to the data I/O line during the first half of the clock pulse through transistor amplifier 39 or 40. During the second half of the clock cycle, gate 58 provides an output to the CLK input of bistable circuit 42 or 43, the Q and not-Q outputs of which are connected to programmable devices 46 and 47, as previously described. Bistable circuits 42 and 43 are of a type which is caused to change state only when suitable input levels are present concurrently at its "clock" and "data" inputs, marked CLK and D. Opposite outputs appear at Q and not-Q, one of which is connected through a driver amplifier to output A or output B. The data line is normally high and an input pulls the line low. Thus, if there is no input signal present during the low half of the clock pulse, no change in the state of the bistable circuits will be accomplished and the circuit output will remain latched.

Reset circuit 50, previously described, includes an operational amplifier 67 with resistive feedback and with a timing circuit including a charging resistor 38 and capacitor 69. Clock pulses are supplied through a resistor 70 and diode 71 to keep the input of amplifier 67 low. If the pulses are absent for an interval of time determined by the values of the RC circuit, charging current causes the amplifier to be conductive, producing a negative reset pulse at its output.

Figure 4:
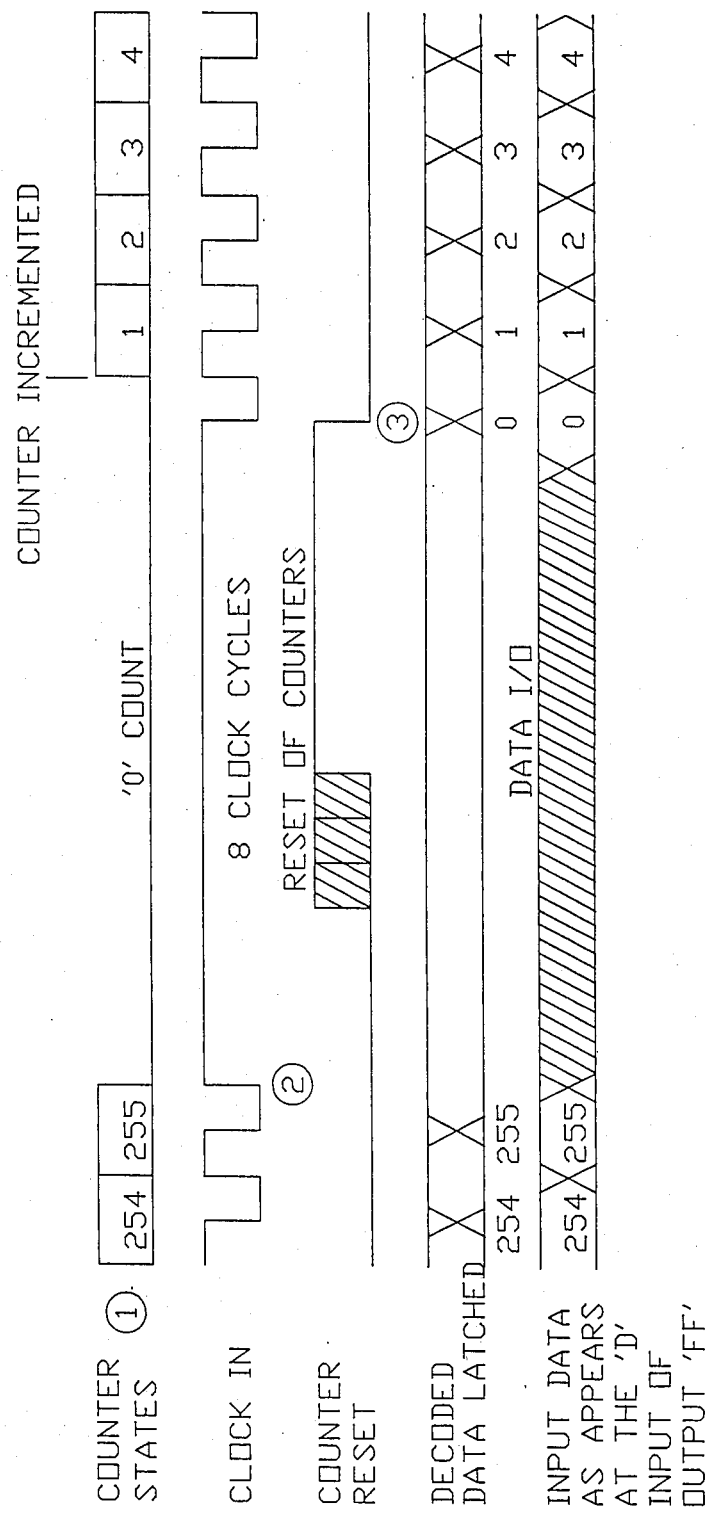
FIG. 4 is a timing diagram showing the time relationship between states in portions of the module of FIG. 3.

FIG. 4 shows some of the timing information at various portions of the system. The top line of FIG. 4 shows the various counter states in which the counter is incremented through 256 counts. Line 2 shows the clock input and it will be apparent from the comparison of lines 1 and 2 that the counter is incremented at the positive transition of each cycle of the clock pulse and that the negative clock pulse transition occurs midway through the interval during which the counter is in that specific state.

Line 3 illustrates the production of the counter reset as accomplished by circuit 50, this occurring during the illustrated eight cycle suspension of clock pulses. The fourth line of FIG. 4 illustrates the transition times at which the decoded data which has been sent to one of the output bistable circuits is latched, and the last line indicates the times during which input data is applied.

As will now be recognized, the output of either channel in a specific module can be selected to be either high or low by suitable programming of circuits 46 and 47 and that the states of other portions of the system can similarly be programmed to provide the availability of a wide variety of possible circumstances under which the output can be provided.

Figure 5:
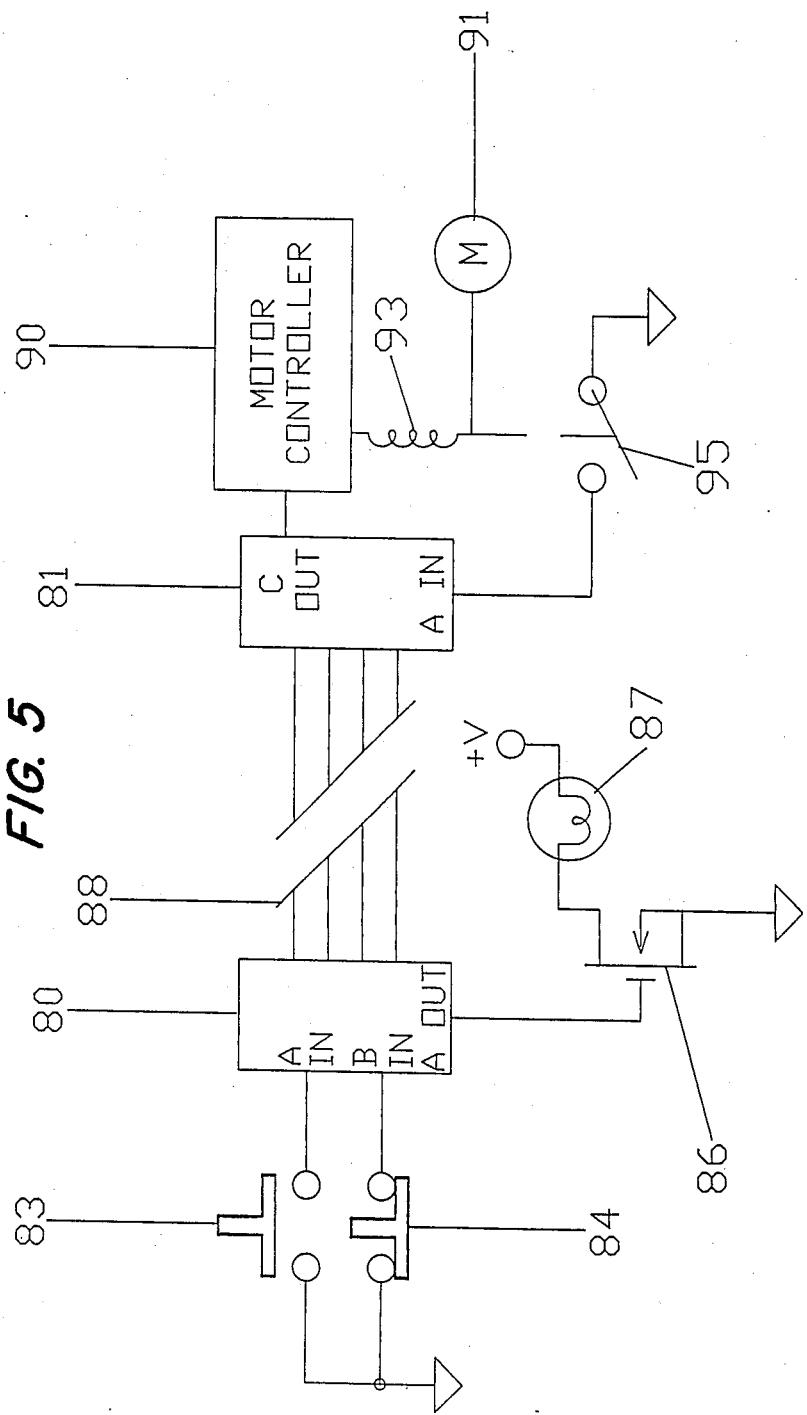
FIG. 5 is a schematic block diagram showing a simple example of the use of portions of the system.

FIG. 5 shows an example of a motor controller circuit which uses two modules 80 and 81 of the type shown in FIG. 3 to energize or deenergize a motor at a location remote from the control location and to provide an indication that the motor is energized. The A input of module 80 is connected to a normally open manually operated switch indicated generally at 83 and input B is connected to a manually operated, normally closed switch indicated generally at 84. The other side of each switch is connected to ground. Also, the A output of module 80 is connected to the gate of a field effect transistor (FET) 86, the source of which is connected to ground and the drain of which is connected through an indicator lamp 87 to a suitable source of voltage.

The modules are interconnected by a four-wire cable 88 and the modules are programmed so that the recognition circuits 33 of each module will respond to the same count and the recognition circuits 34 of each module will also respond to the same count, that count being different from that to which circuit 33 responds.

At module 81, the C output is connected to a motor controller 90 of a conventional type which is connected to a local source of power for energization of a motor 91. As is conventional, the controller includes a relay winding 93, usually as part of the solenoid which energizes the motor. The solenoid is provided with a normally open contact set 95. This contact set is connected between ground and the A input of module 81.

When switch 83 is closed, a low A input is supplied to module 80 which, when the counter reaches the count recognized by the logic circuits 33 in module 80, is coupled to the data line in cable 88 and received by module 81. Similarly, the B input, which is grounded through the normally closed OFF switch, provides a low input which is also coupled onto the data line during the appropriate interval at the count recognized by circuits 34.

In module 81, bistable circuits 42 and 43 are set during their respective intervals to produce outputs A and B. These outputs commence at different times because the two channels are responding to different counter states, but since the bistables latch in the states to which they are moved, the outputs A and B exist together as soon as the second one is produced. These outputs are combined by AND circuit 48 to produce an output C which operates the motor controller. When the controller energizes the motor and relay 93, contact set 95 is closed, providing an input A to module 81. This input A is coupled onto the data line and received by module 80 which responds by producing an A output, rendering FET 86 conductive and energizing lamp 87, thereby giving an indication at the control location that the motor has been energized.

Switch 83 is, of course, a momentary contact switch. Thus, it returns to its normally open position as soon as the operator's finger releases it. When deenergization of the motor is desired, switch 84 is momentarily opened, producing an output in channel B which removes the output of the and gate, deenergizing the motor controller.

The circuit of FIG. 3 also includes a diagnostic feature which facilitates isolation and identification of faults or problems in a system, should one occur. A diagnostic module 100 includes two identical circuits each of which includes amplifier a non-inverting amplifier 101a or 101b, a toggled flip-flop circuit 103a or 103b, an EEPROM 104a or 104b connected to the Q output of its associated flip-flop, and an FET 105a or 105b having its gate connected to the EEPROM. The FET drains are grounded and the sources are connected to the local inputs, FET 105a being connected to input A and FET 105b being connected to input B. Thus, the outputs of the diagnostic module 100 can be used to simulate local inputs A and B. The inputs to inverters 101a and 101b are provided by the outputs of AND circuits 54 and 55.

To use this feature, the normal clock is deactivated and the reset is allowed to time out. A "test" clock input can then be supplied, providing clock pulses either manually generated as desired or at a steady but greatly reduced rate, allowing the various inputs and outputs to be observed and checking every function in the system. This is especially useful in an automobile system. The flip-flops 103a and 103b are set to ON when the count recognized by circuits 33 and 34 are reached and are turned off as the decoder leaves the window for that specific module, being reset on the trailing edge of the pulse.

As will be recognized, this diagnostic circuit lends itself well to automation using a small microprocessor to provide the inputs and verify the existence of the proper outputs.

Figure 6:
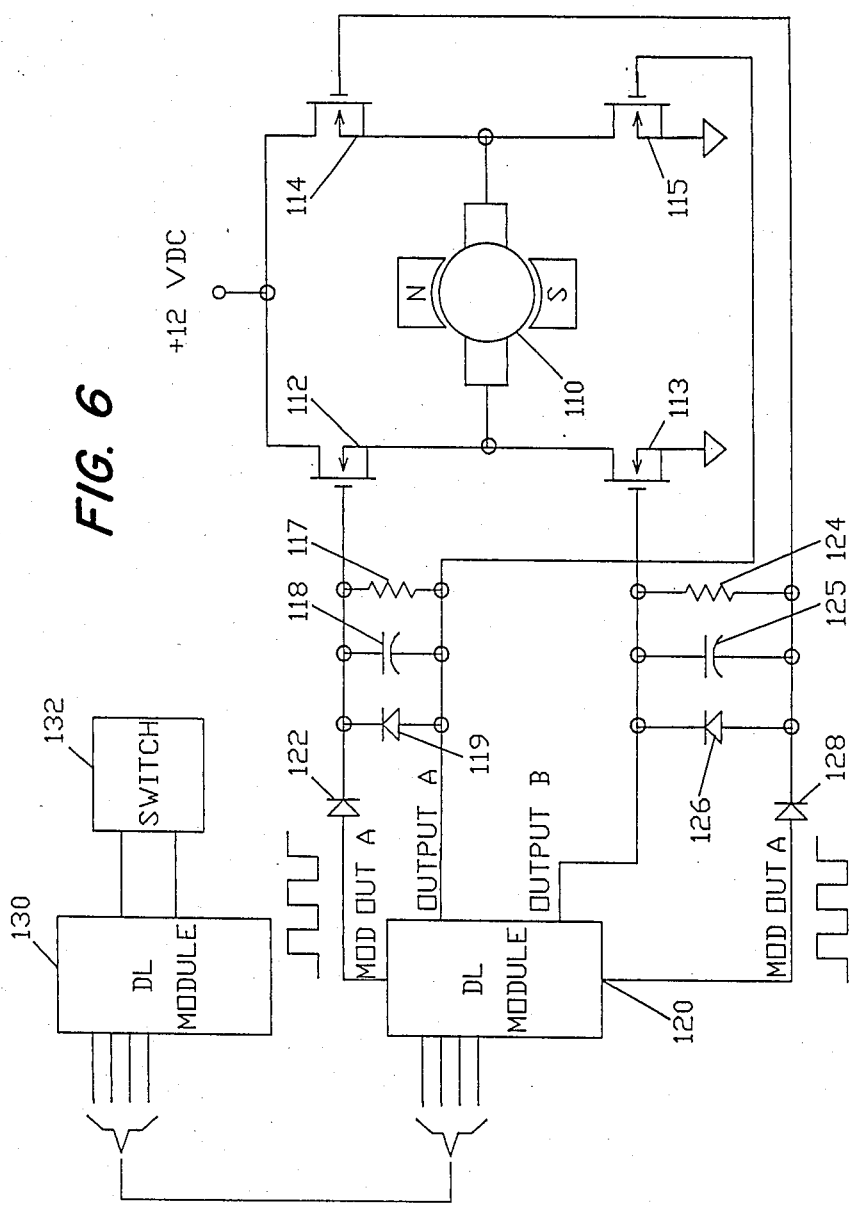
FIG. 6 is a schematic block diagram showing a further example of a motor control using the system.

FIG. 6 shows a motor control circuit which is particularly useful with the modules of the present invention to operate a reversible DC motor of the type commonly used to raise and lower windows or adjust seats in an automobile. The control in that case is a double-pole, double-throw reversing switch having a spring urged return to center so that one simply holds the switch in one position to cause the window to go up and in the other position to reverse the motor and cause the window to go down. Heretofore, the switch would have been directly connected to the motor and to the automobile battery and ground.

In the circuit of FIG. 6, the reversible DC motor 110 is connected across a bridge circuit including four field effect transistors (FET's) 112, 113, 114, and 115. FET's 112 and 113 are connected in series circuit relationship with the drain electrode of FET 112 connected to the automobile 12 volt supply and the source electrode of FET 113 grounded. FET's 114 and 115 are similarly connected in series between the 12 volt supply and ground.

The gate electrode of FET 112 is connected to a circuit including a resistor 117, a capacitor 118 and a diode 119, all connected in parallel with each other, between the gate and output A of a DL module 120. Output A is also connected to the gate of FET 115. The gate of FET 112 is also connected through a diode 122 which supplies the gated clock pulses. The gate of FET 114 is similarly connected to a parallel circuit including a resistor 124, a capacitor 125 and a diode 126, the other terminals of which are connected to output B of module 120 which is also connected to the gate of FET 113.

The gate of 114 is also connected through a diode 128 to the gated clock.

The other end of the interconnecting cable is connected to, among other possible modules, a DL module 130 which is programmed to communicate with module 120 and the A and B input terminals of which are connected to a single-pole, double-throw switch 132.

When switch 132 is moved in one position to ground input A of module 130, output A of module 120 is pulled low allowing the clock pulses to charge capacitor 118 through diode 122. Resistor 117 is selected to have a rather high value on the order of 1 megohm. The clock pulses have sufficient voltage magnitude to charge the capacitor to a level between about 10 and about 11 volts, this value adding to the twelve volts of the supply enabling transistors 112 and 113 to conduct and causing motor 110 to be supplied with a voltage of one polarity so that it rotates in one direction. When the switch is moved in the opposite direction, output B goes low, allowing capacitor 125 to charge and rendering the other series connected FET's conductive, reversing the polarity on the motor and causing it to be driven in the opposite direction. Thus, with a simple grounding switch at the control location, reversible motor operation is achieved.

While certain advantageous embodiments have been chosen to illustrate the invention, it will be understood by those skilled in the art that various changes and modifications can be made therein with departing from the scope of the invention as defined in the appended claims.

What is claimed is:

1. A controller system comprising the combination of
    a control location having a plurality of programmable control modules, each said module having an input device connected thereto for supplying to said module an input signal capable of having only two states;
    a plurality of programmable controlled modules, each said controlled module having an output device connected thereto for performing a specified function, said controlled modules being physically separated from said control location;
    each said control and controlled module being substantially identical to each other said control and controlled module apart from programming,
    a cable having no more than four operative wires interconnecting all of said control modules and all of said controlled modules and spanning the physical separation therebetween;
    means connected to one of the wires in said cable for producing and delivering to said control and controlled modules a sequence of clock pulses of uniform duration periodically interrupted by an interval of no clock pulses to synchronize the operation of said modules; and
    encoding/decoding means including a clock pulse counter in each of said control and controlled modules programmed to permit each said module to respond to a preselected count of said counter to thereby assign to each said module a unique code and thereby uniquely operatively associate each of said control modules with preselected one or ones of said controlled modules programmed to respond to the same count so that a control module responds to an input signal supplied to said control module by the input device connected thereto by producing and coupling to said four-wire cable a control signal at the count unique to said control module and so that said control signal generated by said one control device is recognized and acted upon by only said selected one or ones of said controlled modules programmed to respond to the same count to produce output signals for causing said output device or devices connected thereto to perform said specified functions.

2. A system according to claim 1 wherein said encoding/decoding means includes, in addition to said counter,
    programmable circuit means for recognizing a specific count a said unique code.

3. A system according to claim 2 wherein said controlled module includes first and second output terminals connected to its associated output device, one of said output devices including a motor and control circuit comprising
    a field effect transistor bridge circuit including the source-drain circuits of four field effect transistors;
    circuit means connecting two vertices of said bridge circuit to a positive DC source and common, respectively, so that two of said field effect transistors are connected to said DC source and the other two are connected to common;
    a reversible DC motor connected between the other two vertices of said bridge circuit;
    circuit means connecting said first and second output terminals, respectively, to the gate electrodes of the bridge field effect transistors connected to common;
    circuit means including a series diode connecting said source of clock pulses to the gate electrodes of the other two field effect transistors in said bridge; and
    first and second charging circuit means connected respectively between the gate electrodes of field effect transistors at opposite sides of said bridge so that when an output signal is produced on one of said output terminals, said clock pulse source charges one of said charging circuit means to render one side of said bridge conducting and cause said motor to rotate in one direction and when an output signal is produced on the other one of said output terminals, said clock pulse source charges the other one of said charging circuit means to render the other side of said bridge conducting and cause said motor to rotate in the opposite direction.

4. A programmable module usable as either a control module or a controlled module in a digital control system comprising the combination of
    a signal input terminal, a signal output terminal and a data input/output terminal;
    a source of clock pulses;
    a counter connected to receive clock pulses from said source for producing a digital output representative of the pulse count;
    programmable logic circuit means connected to receive the output of said counter and programmed to produce an output in response to a preselected count;
    gate circuit means connected to receive the output of said logic circuit means and clock pulses from said source and connected to said input terminal;
    bistable circuit means connected to the output of said gate circuit means and to said data input/output terminal for assuming a state consistent with the high/low state on said data input/output terminal in response to the output of said gate circuit means;

programmable means at the output of said bistable circuit means for producing a module output signal in response to the state of said bistable circuit means.

5. A control system comprising the combination of
means for producing clock pulses each having first and second portions of substantially equal length;
a plurality of substantially identical modules each having local input and output terminals and a data I/O terminal any of which are capable of assuming either one of two electrical levels, selected ones of said modules having input devices connected to their input terminals or output devices connected to their output terminals;
a plurality of electrical conductors interconnecting said terminals of said modules with each other, one of said conductors being connected to said means for producing block pulses; and
circuit means in each said module including
  a counter connected to receive and count said clock pulses,
  a count recognition circuit connected to receive the output of said counter and to produce an output when a specific count is reached,
  programmable means connected to said count recognition circuit for establishing the unique count to be recognizable by each of said count recognition circuit in each said module, and
  logic circuit means responsive to the state of one said input terminal, the output of said count recognition circuit and to said clock pulse for producing a module output signal on said data I/O line during one portion of said clock pulse and responsive to the output of said count recognition circuit and the state of said data I/O line for producing an output to said local output terminal during the other portion of said clock pulse.

6. A system according to claim 5 wherein each said module further includes
  a second count recognition circuit connected to receive the output of said counter and to produce an output when a specific count is reached,
  second programmable means connected to said count recognition circuit for establishing the unique count to be recognizable by each said second count recognition circuit in each said module, and
  second logic circuit means responsive to the state of another said local input terminal, to the output of said second count recognition circuit and to said clock pulse for producing a module output signal on said data I/O line during one portion of said clock pulse and responsive to the output of said second count recognition circuit and the state of said data I/O line for producing a output to one said local output terminal during the other portion of said clock pulse.

7. A system according to claim 6 wherein said first and second logic circuit means each includes a bistable circuit, each said bistable circuit being independently settable to a predetermined state to produce first and second module outputs, said module further including
  an AND circuit connected to receive the outputs of said bistable circuits and to produce a third module output.

8. A control system comprising the combination of
first and second structurally identical modules each including a clock pulse counter, programmable means for producing a control output in response to a predetermined count in said counter, a local input terminal and a local output terminal;
input means connected to said input means of said first module and output means connected to said output terminal of said second module, said input means being operable to produce a signal at said input terminal at either of two electrical levels, and said output means being responsive to at least one of two electrical levels at said output terminal;
a plurality of wires extending between said modules including a power wire, a clock pulse wire and a data wire, said clock pulse wire being connected to said counter;
means for producing clock pulses connected to said clock pulse wire for delivery to both of said modules;
first logic circuit means in said first module responsive to said control output to couple to said data wire a level representative of the signal at said input terminal during the clock pulse next following said predetermined count; and
second logic circuit means in said second module responsive to said control output to provide to said output terminal a level representative of said level on said data wire during said clock pulse next following said predetermined count.

9. A system according to claim 8 wherein said first logic circuit means coupled said signal during the first half of said clock pulse next following said predetermined count.

* * * * *